July 28, 1942.     D. J. BRUNNER, JR     2,291,370
COLLISION GUARD MEANS FOR VEHICLES
Filed April 21, 1941     2 Sheets-Sheet 1
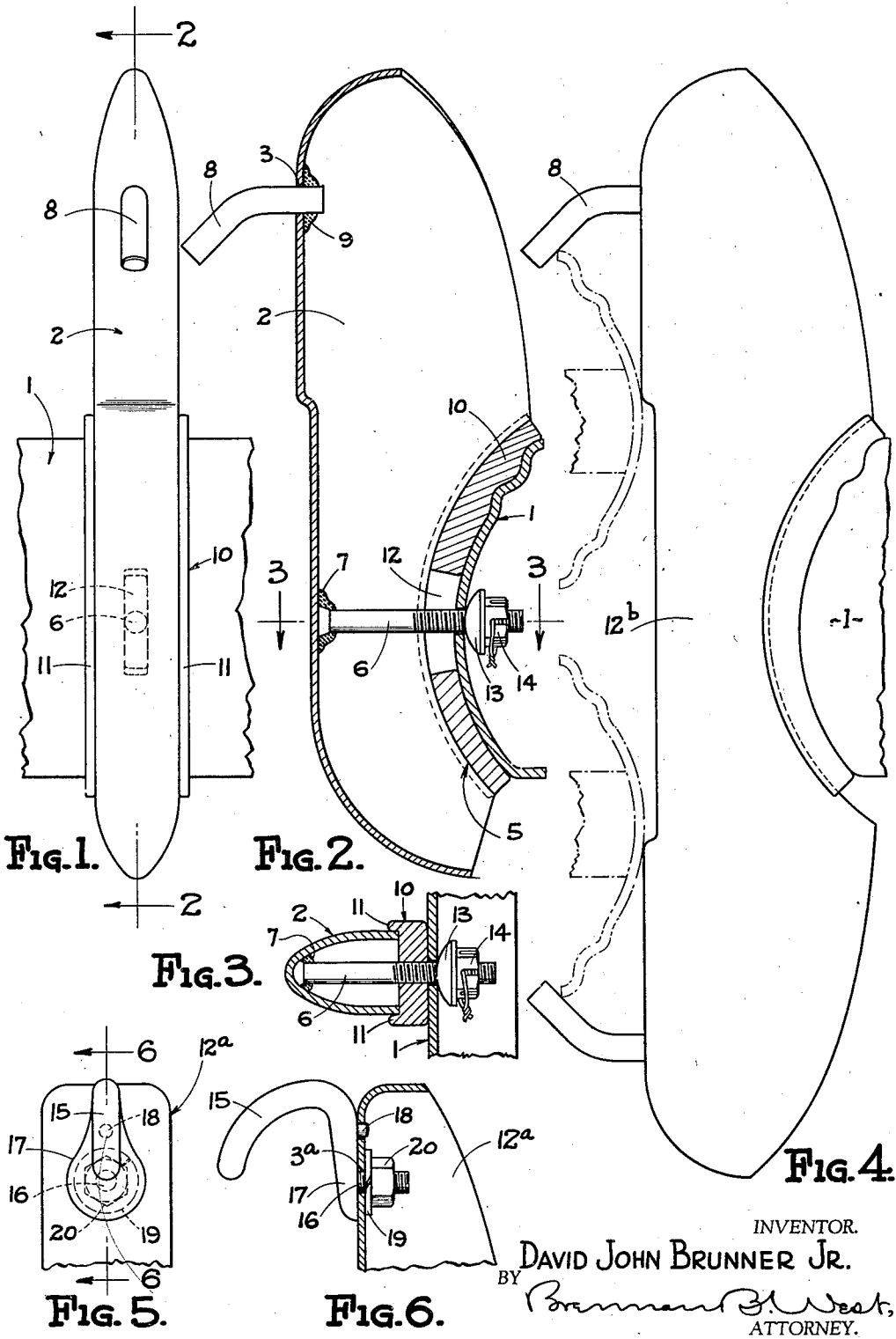
INVENTOR.
DAVID JOHN BRUNNER JR.
BY
ATTORNEY.

July 28, 1942.  D. J. BRUNNER, JR  2,291,370
COLLISION GUARD MEANS FOR VEHICLES
Filed April 21, 1941  2 Sheets-Sheet 2
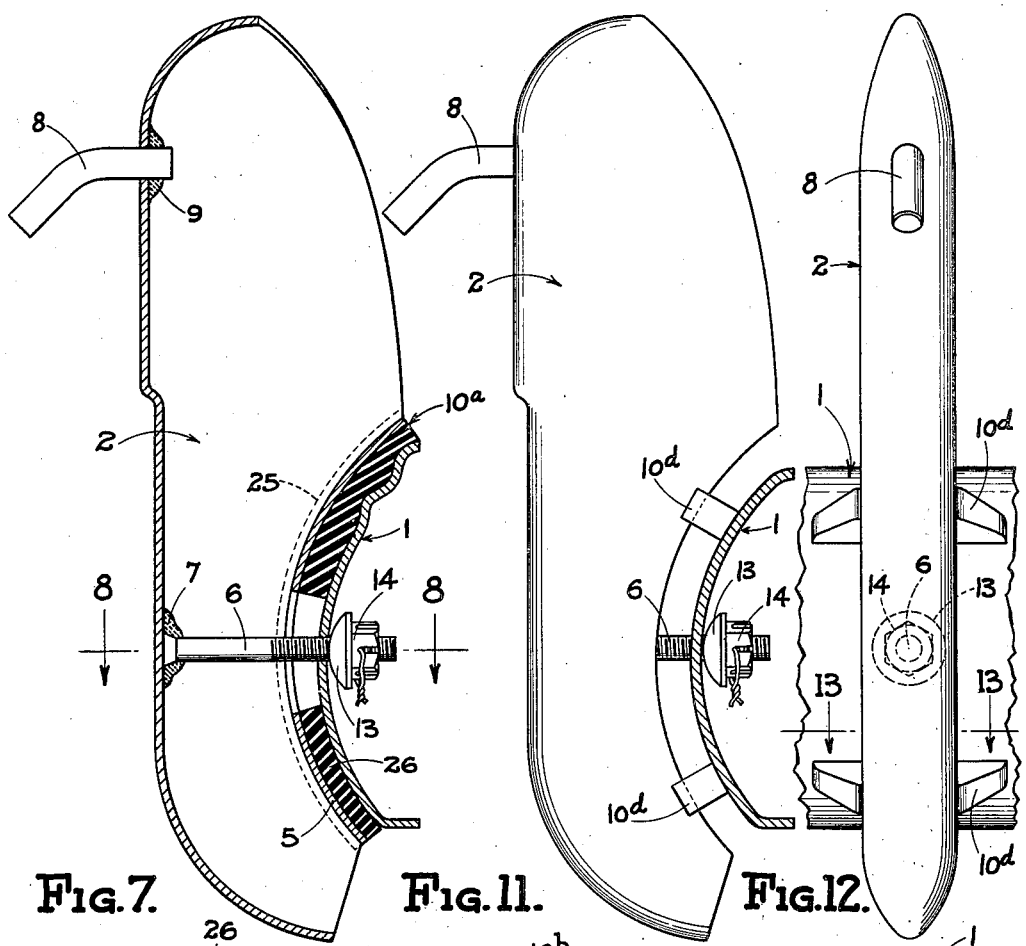
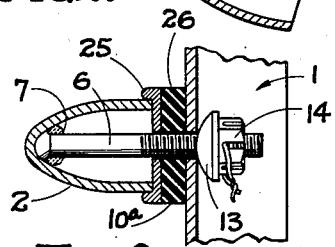
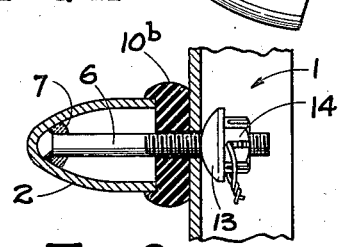
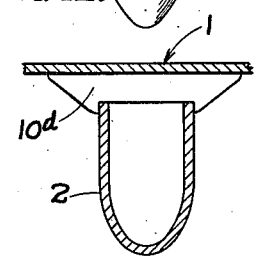
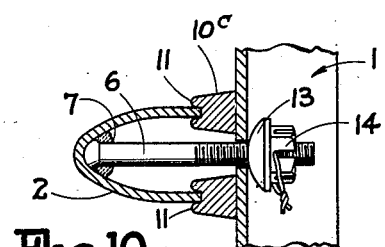
INVENTOR.
DAVID JOHN BRUNNER JR.
BY
ATTORNEY.

Patented July 28, 1942

2,291,370

UNITED STATES PATENT OFFICE 2,291,370

COLLISION GUARD MEANS FOR VEHICLES

David John Brunner, Jr., Shaker Heights, Ohio

Application April 21, 1941, Serial No. 389,530

12 Claims. (Cl. 293—55)

The present invention, like that constituting the subject matter of Letters Patent No. 2,038,714, granted to me on April 28, 1936, relates to guard means for protecting vehicles in the case of collisions, or, in its more limited aspect, to a collision guard attachment for vehicle bumper bars.

The general object of the invention is to provide collision guard means that positively prevents the overriding of the guard means of one vehicle by that of another.

A more limited object is to provide an anti-override attachment for vehicle bumper bars of standard design that is simple and convenient of installation.

Another object is to provide a well constructed attachment of high quality for the bumper bars of vehicles that is in the nature of a collision guard, desirably incorporating anti-override means, and, in combination therewith, an inexpensive adapter through which the attachment may be properly fitted to a bumper bar of a given style. Thus, a collision guard of especially good quality and attractive design and finish may be produced in quantity at minimum cost, and, by the selection of appropriate ones of a series of relatively cheap adapters, the same may be properly fitted to any one of a number of standard style bumper bars.

Another object is the provision of an adapter of the aforesaid character that is constructed in whole or in part of compressible or resilient material for either or both of two purposes, namely: that of absorbing the shock of impact to a certain extent in the case of collision, and that of effecting a proper fit of the same adapter to bumper bars of somewhat different contour.

A further object of the invention is to provide an attachment for vehicle bumper bars comprising a pressed metal guard member in the form of a rearwardly opening shell that is adapted to be disposed transversely of the bar and having in vertically spaced relation to and a material distance from the plane of the bar an aperture, and an anti-override stop having a shank extended rearwardly through said aperture and secured to the guard by means concealed therein. Another object related to the one just mentioned is the provision of interlocking parts on the stop and guard for preventing the former from turning with respect to the latter. A still further object is to provide an anti-override stop in the nature of a hook having a shank and wherein the hook proper is so related to the shank that strains or stresses imposed on the stop in its normal functioning will tend to retain the stop in proper relation to the guard.

The foregoing objects and others hereinafter appearing are attained in the embodiments of the invention illustrated in the accompanying drawings that form a part hereof and wherein Fig. 1 is a fragmentary front elevation of collision guard means incorporating my improvements; Fig. 2 is a vertical section on the line 2—2 of Fig. 1; Fig. 3 is a horizontal section on the line 3—3 of Fig. 2; Fig. 4 is a side elevation of a form of my improved collision guard means incorporating anti-override stops at top and bottom; Fig. 5 is a fragmentary front elevation of a collision guard equipped with a modified form of the anti-override stop; Fig. 6 is a section on the line 6—6 of Fig. 5; Fig. 7 is a side elevation, partly in section, of a collision guard means showing an installation in which a modified form of the adapter is used; Fig. 8 is a horizontal section on the line 8—8 of Fig. 7; Figs. 9 and 10 are views, similar to Fig. 8, showing further modifications of the adapter; Fig. 11 shows a collision guard in side elevation that is fitted, through adapter means of another form, to a bumper bar; Fig. 12 is a front elevation of the parts shown in Fig. 11, and Fig. 13 is a section on the line 13—13 of Fig. 12.

Considering first the form of the invention illustrated in Figs. 1, 2 and 3, I designates a vehicle bumper bar which may be of standard design and construction. 2 is the collision guard that is adapted to be attached to the bar I in a position transversely thereof. The guard may be of any suitable material and appropriate shape, although it is my present preference to draw it from relatively heavy sheet steel by means of suitable dies into a comparatively deep rearwardly opening shell. The front of the shell is provided with an aperture 3 adjacent its upper end, and the sides, with rearwardly opening notches 5. The edges of these notches are desirably curved on the arc of a circle, and disposed substantially radially thereof inside the shell is a bolt 6 whose inner end is secured to the front of the shell, as by welding, as indicated at 7.

8 is a hook-like anti-override stop whose rear end or shank is projected through the aperture 3 in the front of the guard, and inside the guard the stop is secured thereto, as by welding, as indicated at 9.

Fitting within the notches 5 is an adapter 10, the same being shown as having forwardly extending beads 11 that overlie the sides of the guard along the notches 5; and the rear face or profile of the adapter is made to fit the contour of the bumper bar 1. The adapter is provided with a slot 12 through which the bolt 6 is projected for engagement through a hole in the bar 1, rearwardly beyond which the bolt has applied to it a sperical-faced washer 13 and a nut 14. The nut may be locked to the bolt by any suitable means, as by a wire 14 that is passed through a hole made in the bolt and through notches in the nut, such being a common and well known expedient. The adapter 10 may consist of a malleable iron casting although, as shall presently appear, it may be made of other materials by any suitable method and may take various shapes.

The essential difference between the form of the invention above described and that shown in Fig. 4 resides in the fact that, in the latter case, anti-override stops 8 are located adjacent both top and bottom of the double ended guard 12$^b$. Thus the collision guard means of another vehicle is prevented from overriding or underriding a bumper bar equipped with the present form of the invention.

In Figs. 5 and 6, a modification of the antioverride stop is shown. The stop, designated 15, is in the form of a hook having a threaded shank 16 that extends rearwardly from a base portion 17 thereof, and above the shank 16 is a rearwardly projecting stud 18. The front of the shell 12$^a$ (which differs in shape somewhat from the previous shell 12) is provided with an aperture 3$^a$ through which the shank 16 is extended and has a hole 3$^b$ for the reception of the stud 18. A lock washer 19 and a nut 20 are applied to the shank 16 inside the shell of the guard. While the stud 18 will positively prevent the anti-override stop 15 from turning with respect to the guard 12$^a$, the parts are so designed and proportioned that any force applied to the stop in the performance of its normal function will tend to keep the stop in upright position. This is due to the fact that the body portion of the hook-like stop 15 is above the axis of the shank 16, and any force in an upward direction would tend to retain the stop in a vertical position above the shank rather than to force it out of position. In case such a stop were located below the plane of the bumper bar, the parts and mode of operation would be reversed.

In the remaining views, the bumper bar, guard and its appurtenances are designated by the same reference numerals as are applied thereto in Figs. 1 to 3. Referring now to Figs. 7 and 8, the adapter 10$^a$ is shown as composed of an arcuate channel member 25, that fits within the notches 5 of the guard 2, and a body 26 of a compressible or resilient material, such as relatively stiff natural or synthetic rubber. The channel member 25 may be of metal or plastic material and it and the body 26 are suitably united, as by vulcanizing. The parts 25 and 26 have registering slots through which the bolt 6 passes.

In place of the above described composite construction, the adapter may be made entirely of pliable or resilient material, such as that above mentioned. The adapter is shown so constructed in Fig. 9, where it is designated 10$^b$.

The advantages of constructing the adapter in whole or in part of a pliable or resilient material are that it will absorb some of the shock of impact in case of collision; will reduce or eliminate squeaking or rattling, and it can be compressed so as to conform to and therefore properly fit bumper bars of somewhat different contour, thus reducing the number of adapters that would have to be carried in stock in order to fit the guards to a given number of different style bumper bars.

In Fig. 10, the adapter means consists of two segmental members 10$^c$, each having a channel on its front side for the reception of the adjacent side wall of the guard 2 throughout the length of the notch 5, and in side elevation it has the same appearance as the adapter 10 in the first described form of the invention.

In Figs. 11 to 13, the adapter means is shown as consisting of cleats 10$^d$ that are fitted between the bumper bar and guard above and below the bolt 6, each cleat being shown as notched on its front side to receive the guard 12.

Having thus described my invention, what I claim is:

1. In combination with a vehicle bumper bar, a collision guard carried thereby the same being recessed on its rear side and having an aperture in vertically spaced relation to the plane of the bar, an anti-override stop, and fastening means extended through said aperture and concealed within the recess of the guard for securing the stop to said guard.

2. In combination with a vehicle bumper bar, a collision guard carried thereby, the same being recessed on its rear side and having an aperture in vertically spaced relation to the plane of the bumper bar, an anti-override stop having a shank extended through said aperture, and means concealed within the recess of the guard and cooperating with said shank to secure the stop to the guard.

3. In combination with a vehicle bumper bar, a collision guard carried thereby, the same being recessed on its rear side and having apertures spaced a material distance above and below the plane of said bar, two opposed anti-override stops, one adjacent each aperture, and fastening means extended through said apertures and concealed within the recess of the guard for securing the stops to the guard.

4. In combination with a vehicle bumper bar, a collision guard carried thereby, the same consisting of a sheet metal shell having rearwardly opening notches in its sides for the accommodation of said bar, the front of the guard having an aperture adjacent its end, an anti-override stop having a shank extended rearwardly through said aperture, and means on the interior of the guard for securing said shank within the aperture.

5. A collision guard attachment for vehicle bumper bars, the same consisting of a rearwardly opening sheet metal shell having notches in the rear edges of its sides that are laid off on the arc of a circle, a rigid adapter fitting within said notches and shaped on its rear side to fit a bumper bar having a profile other than one complementary to said notches, means for adjustably securing the guard to a bumper bar in the region of said adapter, the guard having an aperture in vertically spaced relation to the notches and whose axis is at substantially right angles to that of the notches, an anti-override stop having a shank extended rearwardly through said aperture, and means on the interior of the guard for securing said shank within the aperture.

6. In combination with a vehicle bumper bar, a collision guard carried thereby and extending transversely thereof, the same having an aperture adjacent its top whose axis is in a substantially horizontal plane and at substantially right angles to the longitudinal axis of the bumper bar, and an anti-override stop having a shank extended rearwardly through said aperture and secured to the guard, said stop having a base that overlies the contiguous portion of the front surface of the guard.

7. In combination with a vehicle bumper bar, a collision guard carried thereby and extending transversely thereof, the same having an aperture in vertically spaced relation to the plane of said bar, an anti-override stop having a shank extended rearwardly through said aperture and a part that overlies the contiguous portion of the front surface of the guard, and holding means cooperating with the shank on the rear side of the guard for preventing withdrawal of the shank from said aperture.

8. In combination with a vehicle bumper bar, a collision guard carried thereby, the same having an aperture in vertically spaced relation to the plane of said bar, an anti-override stop having a threaded shank extended rearwardly through said aperture and a part that overlies the contiguous portion of the front surface of the guard, said part and the guard having on the one hand a void and on the other a protuberance entering said void thereby to hold the stop against turning with respect to the guard, and a nut applied to the shank on the rear side of the guard.

9. In combination with a vehicle bumper bar, a collision guard carried thereby, the same consisting of a sheet metal shell having rearwardly opening notches in its sides for the accommodation of said bar, the front of the guard having an aperture adjacent its end and provided with a hole contiguous to said aperture, an anti-override stop having a threaded shank extended rearwardly through the aperture and provided with a stud engaged within said hole, and a nut applied to the shank rearwardly of the guard.

10. In combination with a vehicle bumper bar, a collision guard carried thereby, the same consisting of a sheet metal shell having rearwardly opening notches in its sides, rigid adapter means occupying said notches and having abutments overlying the sides of the shell to prevent spreading thereof under impact, the rear side of the adapter bearing against said bar, the guard having an aperture adjacent its end, an anti-override stop having a shank extended rearwardly through said aperture, and means on the interior of the guard for securing said shank within the aperture.

11. A collision guard attachment for vehicle bumper bars, the same consisting of a rearwardly opening sheet metal shell having notches in the rear edges of its sides, an adapter fitting within said notches, and means for securing the guard to a bumper bar in the region of said adapter, the said adapter being composed of a forwardly opening rigid channel embracing the sides of said shell, and a body of compressible material applied to the rear side of said element for engagement with the bumper bar.

12. A collision guard attachment for vehicle bumper bars, the same consisting of a sheet metal shell having rearwardly opening notches in its sides, adapter means disposed within said notches and arranged for engagement with the front surface of a bumper bar, and means for fastening the shell to a bumper bar with the adapter means interposed between the shell and the bar, said adapter means comprising a plurality of members that are extended transversely of the shell and are provided with abutments overlying the outer surfaces of the sides of said shell to prevent spreading thereof under impact.

DAVID JOHN BRUNNER, Jr.